United States Patent [19]

Raidel

[11] Patent Number: 4,711,465
[45] Date of Patent: Dec. 8, 1987

[54] SUSPENSION SYSTEM WITH SWAY GUIDE

[76] Inventor: John E. Raidel, Rte. 1, Box 400-M, Springfield, Mo. 65804

[21] Appl. No.: 752,807

[22] Filed: Jul. 8, 1985

[51] Int. Cl.$^4$ .............................................. B60G 11/46
[52] U.S. Cl. .................................... 280/712; 280/718; 267/31
[58] Field of Search .................. 180/69.1; 280/152 R, 280/687, 157, 711–713, 160, 725; 267/22 R, 31, 32; 188/322.12

[56] References Cited

U.S. PATENT DOCUMENTS

| | | | |
|---|---|---|---|
| 1,868,382 | 7/1932 | Coadov | 280/152 R |
| 2,902,275 | 9/1959 | Hammond et al. | 267/31 |
| 3,063,732 | 11/1962 | Harbers et al. | 267/32 |
| 3,231,258 | 1/1966 | Brownyer | 280/712 |
| 3,494,608 | 2/1970 | McGee | 280/712 |
| 4,093,272 | 6/1978 | Raidel | 280/718 |
| 4,494,772 | 1/1985 | Smith | 267/31 |

Primary Examiner—John J. Love
Assistant Examiner—Karin L. Ferriter
Attorney, Agent, or Firm—Rogers, Howell, Moore & Haferkamp

[57] ABSTRACT

A vehicle suspension system for suspending a vehicle from an axle may be used on a steering axle and includes resilient members, such as two air springs, on opposite longitudinal sides of the axle and supported on seats suspended from the ends of a beam. The beam is connected at its center to the axle. The air springs are are connected to hangers that are mounted to the vehicle chassis. The hangers for the air springs include spaced opposed surfaces that allow a longitudinal sway guide to pass between and be transversely restrained by the surfaces. One end of the sway guide is pivotally attached to a hanger on the chassis and the other end to a shackle. The sway guide comprises a small number of spring leaves that can flex but that are not adequate for load bearing, so almost all of the chassis load is on the air springs. The assembly can be installed as original equipment or retrofit to existing equipment. The beam may be inclined to provide caster to the axle. A hose connection between the air springs can equalize air pressure therein.

26 Claims, 7 Drawing Figures

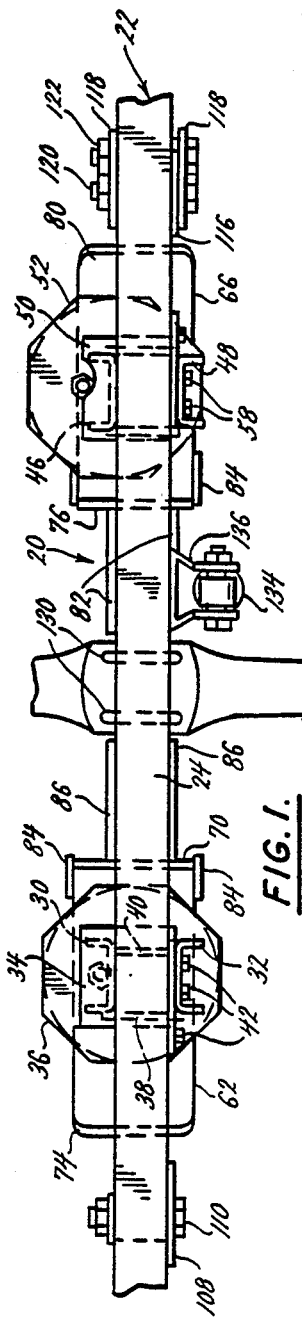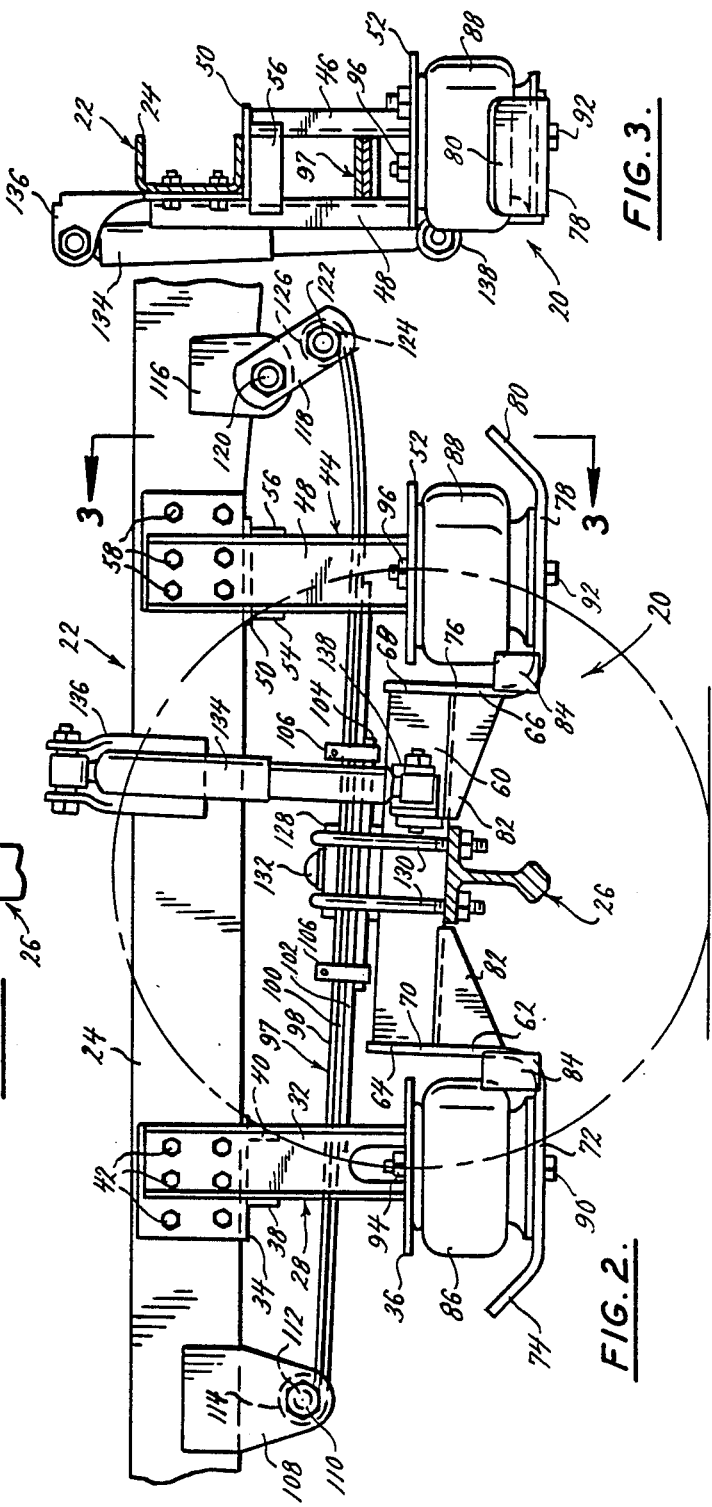

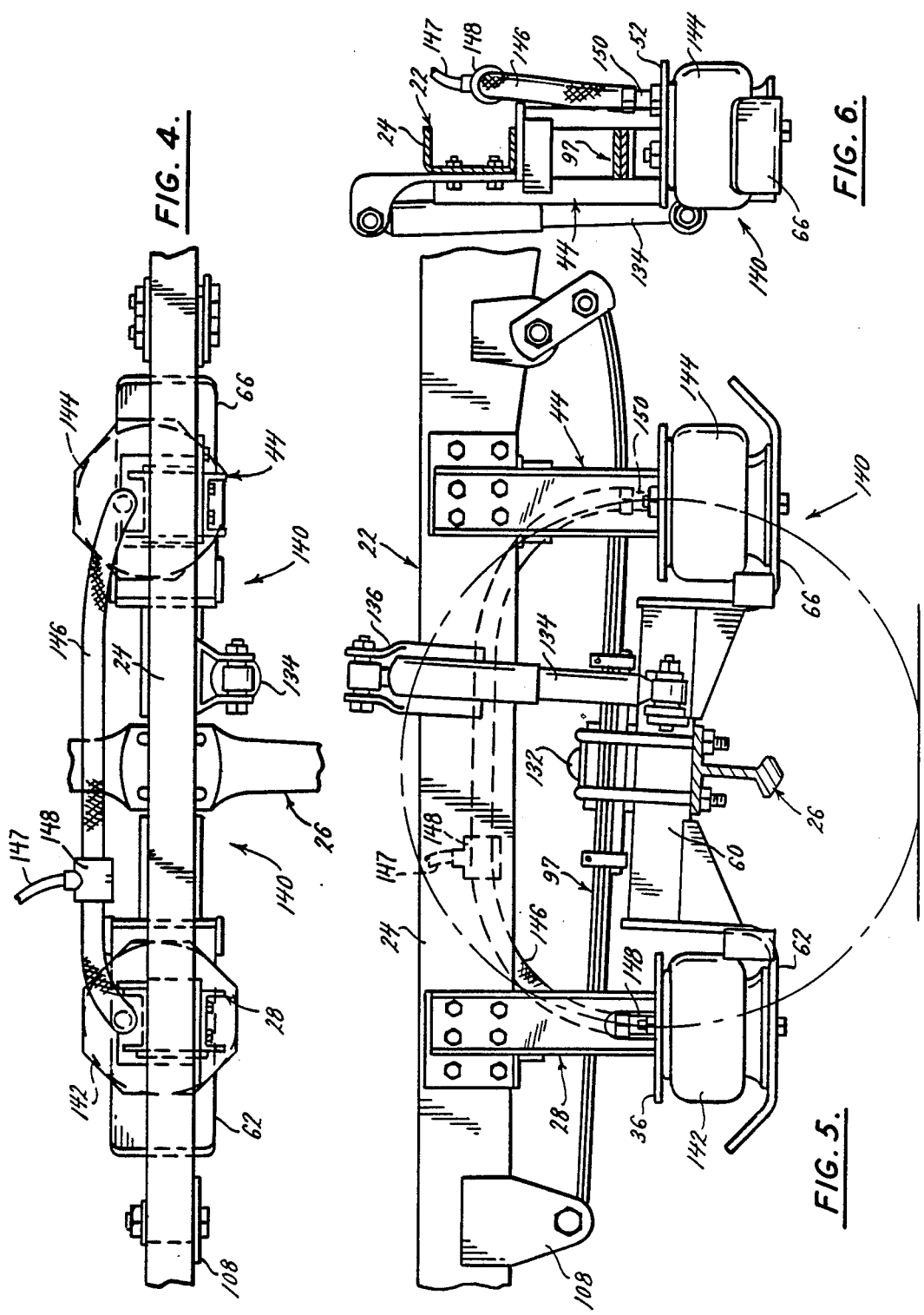

SUSPENSION SYSTEM WITH SWAY GUIDE

BACKGROUND OF THE INVENTION

This invention relates to a suspension system with a sway guide and particularly to such a suspension system wherein the sway guide comprises a flexible, transverse member confined by side restraints to vertical movement. The sway guide is connected to the suspension system to limit movements of the latter accordingly.

Applicant is the inventor of U.S. Pat. Nos. 4,132,432, 4,181,323, 4,278,271, 4,465,298, 4,465,300, 4,494,771, and 4,500,112. Applicant is also aware of U.S. Pat. Nos. 865,259, 2,352,446, 2,746,766, 2,963,301, 3,201,143, 3,477,738, 3,960,388. The disclosures of the above listed patents are incorporated by reference herein and disclose various suspension systems. However, none of the references discloses a suspension system of the kind set forth in this application.

SUMMARY OF THE INVENTION

This suspension system incorporates two air springs on low-hung spring seats on opposite sides of a beam under a vehicle chassis. Since two air springs are used instead of one, the size of each air spring is reduced, allowing the width of the entire suspension assembly to be reduced. The tops of the air springs are connected to front and rear bracket assemblies that depend downwardly from the chassis. Each bracket assembly includes a pair of vertical, parallel inner and outer channels having an open area between them. An axle guide formed of a few leaf springs acts as an axle guide for front and reart directional stability. The axle guide also acts as a sway guide that extends longitudinally through the two open areas and its lateral or transverse movement is therefore restricted by the channels. At its front end, the sway guide is pivotally joined to a hanger that is fixed to the chassis. At its rear end, the sway guide is pivotally joined to a shackle that in turn is pivotal in a bracket also fixed to the chassis. The sway guide comprises a small number of substantially straight spring leaves clamped as a group to the beam and to the vehicle axle. The channels on either side of the sway guide restrict its movement to a generally vertical plane and prevent lateral movement. The suspension assembly accordingly can be installed on steering axles in spaces not having room for a sway bar or other lateral guide.

Because of its compact nature, this suspension system can be installed on a conventional vehicle chassis. In particular, the suspension system is so compact that it can be installed on steering axles of substantially all conventional vehicles including light trucks and other small vehicles that have a limited amount of space available for a suspension system. This suspension system can be installed on equipment as originally manufactured and can also be conveniently retrofit to vehicles which were originally equipped with other suspension systems.

Consequently, it is an object of this invention to provide a compact suspension for a vehicle axle.

It is an object of this invention to provide a compact suspension system which can be used on a steering axle of a vehicle.

It is an object of this invention to provide a compact suspension system having a small number of parts.

It is an object of this invention to provide a compact vehicle suspension system which does not require a sway bar.

It is an object of this invention to provide as double air spring suspension system that incorporates a unique sway guide.

It is a further object of this invention to provide a compact suspension system which can be adapted to provide varying degrees of caster to a vehicle axle.

It is an object of this invention to provide an air spring suspension system that is stabilized by a sway guide.

It is a further object of this invention to provide a compact vehicle suspension which utilizes a spring to perform the function of an anti-sway bar.

Further objects and benefits of the invention will be apparent from the drawings, the Description of the Drawings, the Description of the Preferred Embodiments, and the claims.

DESCRIPTION OF THE DRAWINGS

FIG. 1 is a partial top plan view of the left portion of a first embodiment of the suspension system;

FIG. 2 is a side view of the suspension system shown in FIG. 1;

FIG. 3 is a cross-sectional view taken along the plane of lines 3—3 in FIG. 2;

FIG. 4 is top plan view of the left portion of a second embodiment of the invention;

FIG. 5 is a side view of the suspension system shown in FIG. 4;

FIG. 6 is a cross-sectional view taken along the plane of the lines 6—6 of FIG. 5.

DETAILED DESCRIPTION OF PREFERRED EMBODIMENTS

Figure 7:
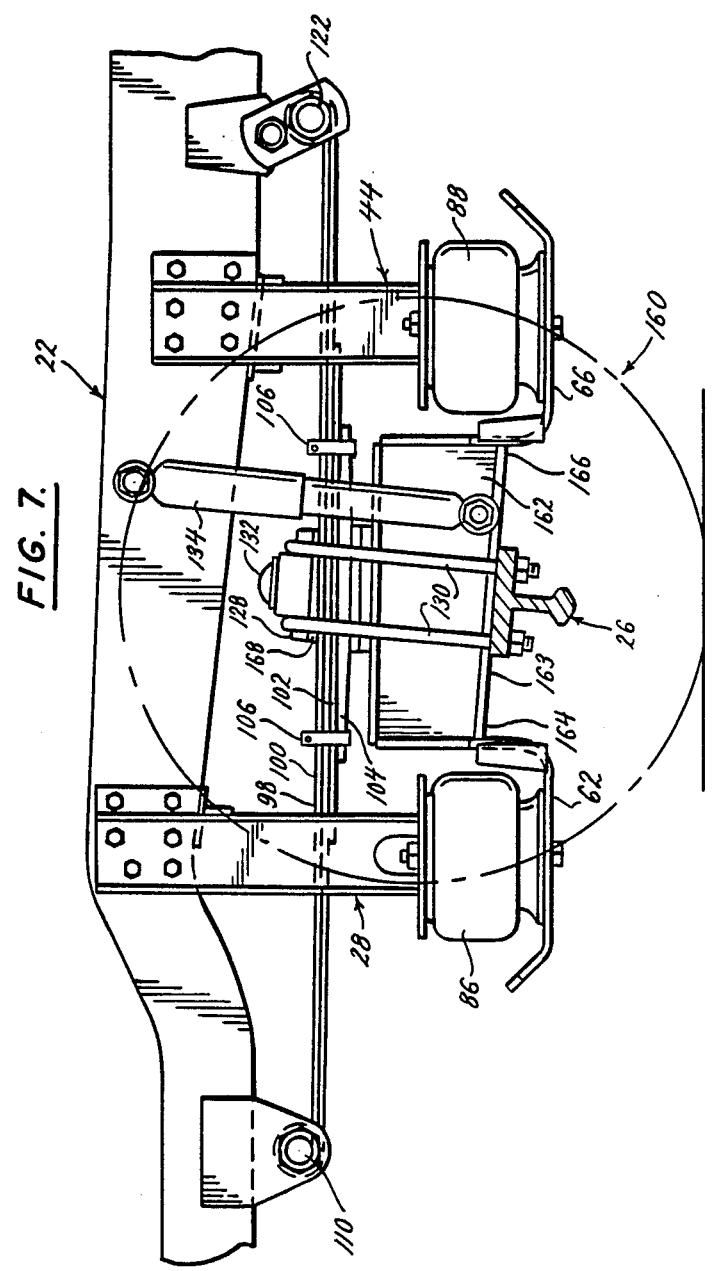
FIG. 7 is a side elevational view of a third embodiment of the suspension system.

As shown in FIGS. 1 and 2, the suspension system 20 is installed on opposite sides of a vehicle chassis 22. As will be apparent from the description to follow, this suspension system 20 is very compact so it can be used, where available space is limited, either as original equipment or as retrofit equipment. The suspension system 20 is particularly suitable for installation in connection with a steering axle. The chassis 22 is of the kind that has left and right steel side rail members of which the left one 24 is the one illustrated, and as is well recognized, a companion suspension system 20 would be installed on the right side. The suspension systems 20 support a vehicle axle 26, as will be described.

To mount the suspension system 20, a forward bracket assembly 28 depends downwardly from the rail frame member 24. The bracket assembly 28 comprises inner and outer vertical channel members 30 and 32 that are parallel and spaced from one another and are held together by horizontal upper and lower plates 34 and 36 as well as cross plates 38 and 40. The bracket assembly 28 is affixed to the rail frame member 24, such as by bolts 42.

A rear bracket assembly 44 is similar to the front bracket assembly 28 in that it comprises parallel inner and outer channel members 46 and 48 that are spaced from one another and are held together by upper and lower plates 50 and 52 and vertical reinforcing plates 54 and 56. The bracket assembly 44 is fixed to the rail frame member 24, such as by bolts 58.

The suspension system 20 includes a beam 60 having a spring seat 62 welded to its front end 64 and another spring seat 66 welded to its rear end 68. In addition to a vertical portion 70 where it is attached to the beam 60, the spring seat 62 has a horizontal portion 72 and an upwardly inclined portion 74 that acts as a rock guard. Similarly, the spring seat 66 has a vertical portion 76, a horizontal portion 78, and an upwardly inclined portion 80. Reinforcing and strengthening gusset plates, such as the plates 82 and 84, are used as necessary. Because the horizontal portions 72 and 78 of the spring seats 62 and 66 are joined to the lower extremes of the vertical portions 70 and 76, the horizontal portions 72 and 78 are displaced downwardly from the beam 60.

Front and rear air springs 86 and 88 are mounted on the spring seats 62 and 66, such as by bolts 90 and 92 tightened against the horizontal portions 72 and 78. The upper sides of the air springs 86 and 88 are fastened to the horizontal plates 36 and 52, respectively, such as by bolts 94 and 96. The downward displacement of the horizontal portions 72 and 78 allows the air springs 86 and 88 to be located below the horizontal plates 36 and 52, leaving the areas between the front channel members 30 and 32 and the rear channel members 46 and 48 unrestricted.

A sway guide 97 comprises a group of leaf springs 98, 100, 102 and 104 held together by removable clips 106 as is known in the art. This sway guide 97 is supported from a front hanger bracket 108 by a pivot mount 110 with the uppermost spring leaf 98 having an eye 112 pivotal about the pivot mount 110, and if desired, the next spring leaf 100 may have a wrapper 114 wound about the eye 112. The hanger bracket 108 is welded or otherwise secured to the rail frame member 24. At the rear, a bracket 116 depends from the rail frame member 24 and supports a shackle 118 about a pivot mount 120. At its other end, the shackle 118 has a stud 122 about which an eye 124 of the spring leaf 98 can pivot. Again, the spring leaf 100 may have a wrapper 126 about the eye 124.

Centrally, the leaf springs 98, 100, 102 and 104 are clamped to the beam 60 and the axle 26 by a plate 128 and U-bolts 130 which are tightened to join these components as a unit. The plate 128 carries a resilient bumper 132 located directly below the rail frame member 24. To limit extreme upward movement of the beam 60 and axle 26, the bumper 132 will contact the rail frame member 24. The sway guide 97 extends between the forward channel members 30 and 32 and between the rear channel members 46 and 48. With these pairs of channel members straddling the sway guide 97, lateral or side-to-side movement of the sway guide is prevented, but vertical movement is uninhibited. Since the sway guide 97 is tightly clamped to the beam 60 and the axle 26, these components likewise are unrestricted in vertical movement but are restrained from lateral movement relative to the chassis 22. In this manner, the restraint of the sway guide 97 eliminates the need for a sway bar. This is particularly important in an installation of the kind herein illustrated where there is essentially no room for a sway bar. Also, since the beam 60 is well below the rail frame member 24, a rub plate is not feasible.

A shock absorber 134 is connected between upper and lower brackets 136 and 138. The upper bracket 136 is affixed to the rail frame member 24 and the lower bracket 138 is affixed to the beam 60.

In the embodiment illustrated in FIGS. 4 through 6, a suspension system 140 is similar to the system already described, and substantially identical components will not be re-described. In the suspension system 140, there are front and rear air springs 142 and 144, and they are connected together by an air hose 146 having its front end 148 connected to the air chamber within the air spring 142 and its rear end 150 connected to the air chamber within the air spring 144. The air hose 146 equalizes air pressure between the springs 142 and 144 at all times. There may be an additional hose 147 connected to a tee 148 in the air hose 146 and leading from a source of air pressure, such as an air compressor or an air accumulator, controlled by a suitable valve, all as known in the art. The connection of the additional hose 147 to the hose 146 may be by any conventional means such as a tee 148 as known in the art.

In FIG. 7, another embodiment is shown wherein a suspension system 160 has most of its components identical to those already described. However, in the system 160, the previously-described beam 60 is replaced by a tapered beam 162, the bottom side 163 of which is inclined downwardly from its front end 164 toward its rear end 166. A similarly tapered plate 168 between the plate 128 and the upper spring leaf 98 allows the U-bolts 130 to be inclined and approach the bottom side 163 of the beam 162 at right angles. This tapered beam 162 allows the axle 26 to be installed at a forward incline, to achieve a desired caster of the axle. The degree of taper of the beam 162 will control the degree of caster.

As an alternative to the structure of FIG. 7, the caster of the axle 26 can be changed by lowering the point where the beam 60 (FIG. 2) is attached to the vertical portion 76 of the spring seat 66. Another alternative would involve lengthening the channel members 46 and 48 of the rear bracket assembly 44. However, these latter alternatives have the disadvantage of lowering the sway guide 97 at the point where the U-bolts 130 are connected. Hence, the tapered beam 162 is preferred.

OPERATION

It should first be said that this suspension system 20 is particularly well suited for the steering axle of a vehicle. It may be installed as original equipment on a vehicle or it may be retrofitted to an existing vehicle. Since the beam 60 is short, as is permitted by this system, the air springs 86 and 88 are very close to the axle 26. Preferably, the air springs 86 and 88 are equi-distant from the axle 26 which permits them to be of the same size and capacity. Because two air springs 86 and 88 are used, the width of the suspension system can be significantly reduced compared to single air spring systems. For example, the width of the spring seats 62 and 66 may be only six inches compared to a conventional twelve inches. As a result, this suspension system 20 (or the systems 140 and 160) can fit in a smaller space.

The sway guide 97, if for a new installation, consists of fewer than the normal number of spring leaves 98–104 than would be used for actual load bearing, and the leaves are flatter than normal. If the installation is retrofit, some of the existing spring leaves are removed to retain only three or four leaves to act as the sway guide 97. The retained spring leaves are flattened to remove most or all of the curvature in them. The purpose is for the sway guide 97 to be capable of flexing and otherwise to act only as an axle guide to eliminate the need for a sway bar. Thus, the sway guide 97 is not intended to be load bearing, and in fact, the air springs 86 and 88 absorb nearly all of the load of the vehicle. Also, the shackle 118 is shorter than normal, being about three inches in span between the pivot pins 120 and 122. The shortened shackle 118 relieves loads on the sway guide 97 in the normal position of the suspension system and also cooperates with the length of the sway guide 97 to limit the downward travel of the axle 26.

As the axle 26 moves up and down, the changing load is absorbed by the air springs 86 and 88, dampened by the shock absorber 134 as is known in the art. No anti-sway bar is needed, because the channel members 30 and 32 straddle the front portion of the sway guide 97, and the channel members 46 and 48 straddle the rear portion of the sway guide 97. Since the sway guide 97 is tightly clamped to the beam 64, and to the axle 26, the sway guide 97 effectively prevents lateral sway between the chassis 22 and the suspension 20.

The end connections 110 and 122 of the sway guide 97 also eliminate squirm, which is the tendency of the axle 26 to swing about the forward bracket 108. In addition, axle wind-up, which tends to occur when the brakes are applied, is prevented. The sway guide 97 and its connections eliminate the requirement of parallelogram connecting elements. The spring clips 106 stabilize the assembly of springs 98–104, and cause all of the spring leaves to function as a group to resist dipping of the chassis when the vehicle brakes are applied.

There are various changes and modifications which may be made to this invention as would be apparent to those skilled in the art. All such changes or modifications are contemplated by the specification and drawings of this application, and this invention is limited only by the scope of the claims appended hereto.

What is claimed is:

1. A suspension system for supporting a vehicle chassis on an axle comprising resilient spring means, means to attach a first end of the resilient spring means to the axle, means to attach a second end of the resilient spring means to the vehicle chassis, a longitudinally extending element having two ends, one end of the element being connected to the chassis and having a portion spaced from said one end and connected to the axle with a section between said one end and said portion extending between the chassis and the axle and movable vertically with vertical movements of the axle, and means comprising two rigid generally vertical, laterally spaced parallel walls supported by the chassis and positioned on opposite sides of and in close proximity to the element intermediate said portion and one of said ends, for restricting lateral movement of the element and thereby limit sway of the chassis in relation to the axle, the walls being free of connections to the element to allow substantially uninhibited vertical movement of the element.

2. The suspension system of claim 1 wherein the element comprises a maximum of four spring leaves with means for clamping the spring leaves together as a unitary group to provide flexibility with reduced load carrying capacity.

3. The suspension system of claim 1 wherein the means cooperating with the element comprises bracket means having laterally spaced vertically extending side walls, and the element extends between the side walls in close proximity thereto.

4. The suspension system of claim 1 wherein said one end is the front end of the element and wherein the element has a rear end pivotally connected to a shackle, the shackle being pivotally supported by the chassis, the shackle being a maximum of about three inches long to limit downward travel of the axle.

5. The suspension system of claim 1 wherein the resilient spring means comprises a pair of air springs, the means to attach the air springs to the axle comprising a beam extending transverse to the axle, and means to attach the beam to the axle at an intermediate area of the beam.

6. The suspension system of claim 4 including a bumper between the element and the chassis to limit upward travel of the axle.

7. The suspension system of claim 6 wherein the bumper is mounted on the element directly above the axle and directly below a component of the chassis.

8. The suspension system of claim 5 wherein the air springs have means for balancing the dynamic load resistance.

9. The suspension system of claim 8 wherein the last-named means comprises an air conduit interconnected between the air chambers of the air springs to maintain equalized air pressure therein.

10. The suspension system of claim 1 wherein the element extends transversely to the axle, and means to attach the element to the axle at an intermediate area of the element.

11. The suspension system of claim 1 wherein the resilient spring means comprises an air spring and the means to attach a second end of the resilient spring means to the vehicle chassis comprises a hanger having an upper end connected to the chassis and a lower end connected to the second end of the resilient spring means, said parallel walls being components of the hanger and extending between the upper and lower ends thereof.

12. A compact suspension system for installation on an axle of a vehicle to support a vehicle chassis thereon comprising a pair of resilient air springs positioned longitudinally on opposite sides of the axle, each air spring having a top and a bottom and being alternately compressible and expandable therebetween, a beam connected to the axle at a medial area of the beam, the beam having spring seats at each end thereof, the spring seats being connected to the bottoms of the resilient air springs, a pair of mounting brackets to connect the tops of the resilient air springs to the vehicle chassis, a longitudinally extending sway restraining element connected to the axle at an intermediate location of the element, the element having a forward end attached to the vehicle chassis for pivoting movement in relation thereto, the element having a rear end, means to restrict upward movement and downward movement of the rear end of the element relative to the vehicle chassis, a pair of stops fixed to and depending downwardly from the chassis and longitudinally spaced from said means, the stops having opposed parallel faces positioned adjacent opposite transverse sides of the element intermediate said intermediate location of the element and one of said ends in an area where vertical movement of the element is not restricted by said means whereby the stops restrict transverse movement while permitting substantially uninhibited vertical movement of the element relative to the stops, the stops and element thereby cooperating to limit sway between the vehicle chassis and the vehicle axis.

13. The suspension system of claim 12 wherein the connections of the axle to the beam and the connections of the element to the axle include U-bolt means confining the element and the beam and being secured to the axle.

14. The suspension system of claim 12 wherein the suspension system has means to impart a caster angle to the axle comprising a downwardly and rearwardly inclined lower surface on the beam, the axle having a flat side faced against the lower surface of the beam, whereby the degree of inclination of the lower surface of the beam affects the caster of the axle.

15. The suspension system of claim 14 wherein the beam is tapered.

16. The suspension system of claim 14 wherein the beam is connected between the sway guide and the axle.

17. The suspension system of claim 12 wherein the stops are located between the axle and the forward end of the element.

18. The suspension system of claim 12 wherein the means to restrict upward movement of the rear end of the element relative to the chassis comprises a shackle having one end pivotally connected to the rear end of the element and another end pivotally connected to the chassis.

19. The suspension system of claim 18 wherein the stops are located between the axle and the shackle.

20. The suspension system of claim 19 incuding a second pair of stops fixed to and depending downwardly from the chassis and being located between the axle and the front end of the element, the second pair of stops having opposed parallel faces positioned adjacent transverse sides of the element to further prevent transverse movement while permitting substantially uninhibited vertical movement of the element relative to the second pair of stops.

21. A suspension system for installation on an axle of a vehicle to support a vehicle chassis thereon comprising, front and rear resilient air springs substantially equi-distant respectively from the axle, a longitudinal beam mounted to the axle at a median point of the beam, the beam having mounting spring seats at each end thereof, the air springs having bottoms connected to the spring seats, front and rear mounting brackets to connect the tops of the front and rear resilient air springs respectively to the vehicle chassis, a sway guide extending longitudinally of the vehicle above and spaced from the resilient air springs, the sway guide having a medial area rigidly affixed to the axle, the sway guide having a forward end attached to the vehicle chassis for pivoting movement in relation thereto, and having a rear end pivotally attached to a shackle, the shackle being pivotally attached to the vehicle chassis, the sway guide being formed of spring leaves having an amount of flexure to enable a substantial amount of the spring load of the vehicle to be carried by the resilient air springs, each mounting bracket having opposed parallel, spaced members extending vertically downwardly below the chassis and the sway guide passing through the space between the members, the members of each mounting bracket acting as stops located adjacent the transverse sides of the sway guide to restrict the movement of the sway guide in the direction parallel to the vehicle axle while allowing substantially unrestricted vertical movement of the sway guide to thereby limit sway between the vehicle chassis and the vehicle axle while allowing relative vertical movements therebetween.

22. The suspension system of claim 21 including a pair of plates and wherein the spaced members of each mounting bracket have upper ends fixed to the chassis and lower ends fixed to respective ones of the plates, the tops of the springs being connected to the undersides of the respective plates, whereby the positions of the spaced members of each mounting bracket are reinforced at their upper and lower ends.

23. A suspension system for supporting a vehicle chassis on an axle wherein the chassis has first and second parallel longitudinal rail frame members, comprising a longitudinally extending beam generally below the first rail frame member, a front spring seat connected to the front end of the beam, a rear spring seat connected to the rear end of the beam, means to connect a medial area of the beam to the axle, a front horizontal plate, first support means for supporting the front horizontal plate from and positioned below the first rail frame member and above the front spring seat, a rear horizontal plate, second support means for supporting the rear horizontal plate from and positioned below the first rail frame member and above the rear spring seat, a front air spring having a bottom connected to the front spring seat and a top connected to the front plate, a rear air spring having a bottom connected to the rear spring seat and a top connected to the rear plate, a resilient member connected between the first rail frame member and the beam, the first and second support means each having a pair of parallel transversely spaced surfaces on opposite sides of and close to the resilient member to restrict the resilient member to substantially vertical movement while permitting such longitudinal movement as may occur during flexing of the member, and permitting substantially unrestricted vertical movement of the member.

24. The suspension system of claim 23 wherein the beam is above the axle.

25. The suspension system of claim 24 wherein each spring seat comprises a vertical portion joined to the beam and extending downwardly therefrom and a horizontal portion extending from the lower end of the vertical portion, each air spring being connected to a horizontal portion.

26. The suspension system of claim 25 wherein each spring seat also includes a rock guard in the form of a section inclined upwardly from the horizontal portion, the air spring being between the upwardly inclined section and the vertical portion.

* * * * *